United States Patent [19]

Busskohl

[11] Patent Number: 4,958,395
[45] Date of Patent: Sep. 25, 1990

[54] OUTDOOR CUTTING KIT APPARATUS

[76] Inventor: Arthur C. Busskohl, 50 Greenhouse Rd., Newcastle, Wyo. 82701

[21] Appl. No.: 402,818

[22] Filed: Sep. 5, 1989

[51] Int. Cl.$^5$ .............................................. B25F 1/00
[52] U.S. Cl. ........................................... 7/145; 7/148; 7/167; 30/144; 403/334
[58] Field of Search ..................... 7/144, 145, 148, 167, 7/170; 294/51; 30/123, 138, 144; 403/356, 361, 334, 263

[56] References Cited

U.S. PATENT DOCUMENTS

| | | | |
|---|---|---|---|
| 291,732 | 1/1884 | Holland | 294/51 |
| 306,192 | 10/1884 | Trenor | 403/334 |
| 576,756 | 2/1897 | Cole | 7/167 |
| 704,819 | 7/1902 | East . | |
| 1,021,931 | 4/1912 | James . | |
| 1,284,752 | 11/1918 | Neuman . | |
| 2,105,239 | 1/1938 | Bachtold | 7/145 |
| 2,318,193 | 5/1943 | Branham | 403/334 |
| 2,917,349 | 12/1959 | Saylor et al. | 403/263 |
| 3,285,639 | 11/1966 | Galla et al. . | |
| 3,473,712 | 10/1969 | Genchi | 7/145 |
| 4,023,221 | 5/1977 | Cadman | 7/145 |
| 4,700,420 | 10/1987 | Belanger | 7/167 |

FOREIGN PATENT DOCUMENTS 15930  1/1898  Fed. Rep. of Germany ........ 294/51

Primary Examiner—Roscoe V. Parker
Attorney, Agent, or Firm—Andrus, Sceales, Starke & Sawall

[57] ABSTRACT

A cutting tool kit for outdoorsman consisting of a knife, a saw, a hatchet, and an ax. Four handles including two head handles releasably secured to the coupling hub openings in the ax and hatchet having tubular ends adapted to telescope onto the head handles and to a corresponding shaft on the saw. The hubs and head handles have coupling tapered keyways and keys which taper outwardly from the inner end of the hub to the outer end such that the ax coupling forces increase as the ax tends to move from the handle. The handles have slightly different lengths to form different operations. The grip handles have radial pin openings for coupling to spring-loaded pins in the head handles and shaft. A flat carrying case includes individual pockets for storage of the separate parts of the assembly.

5 Claims, 2 Drawing Sheets

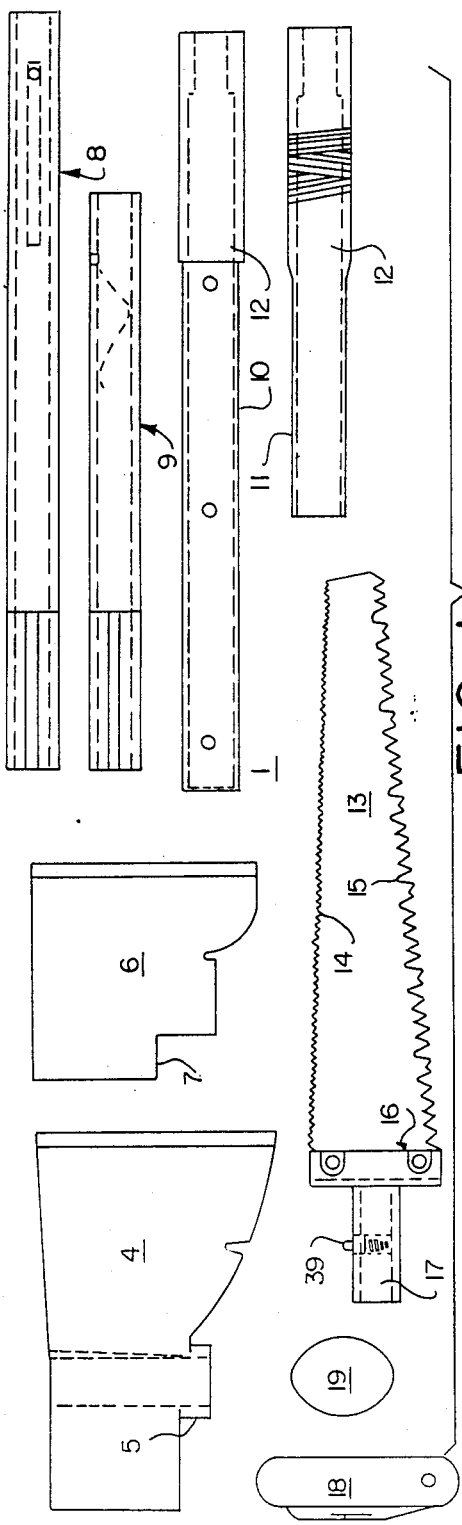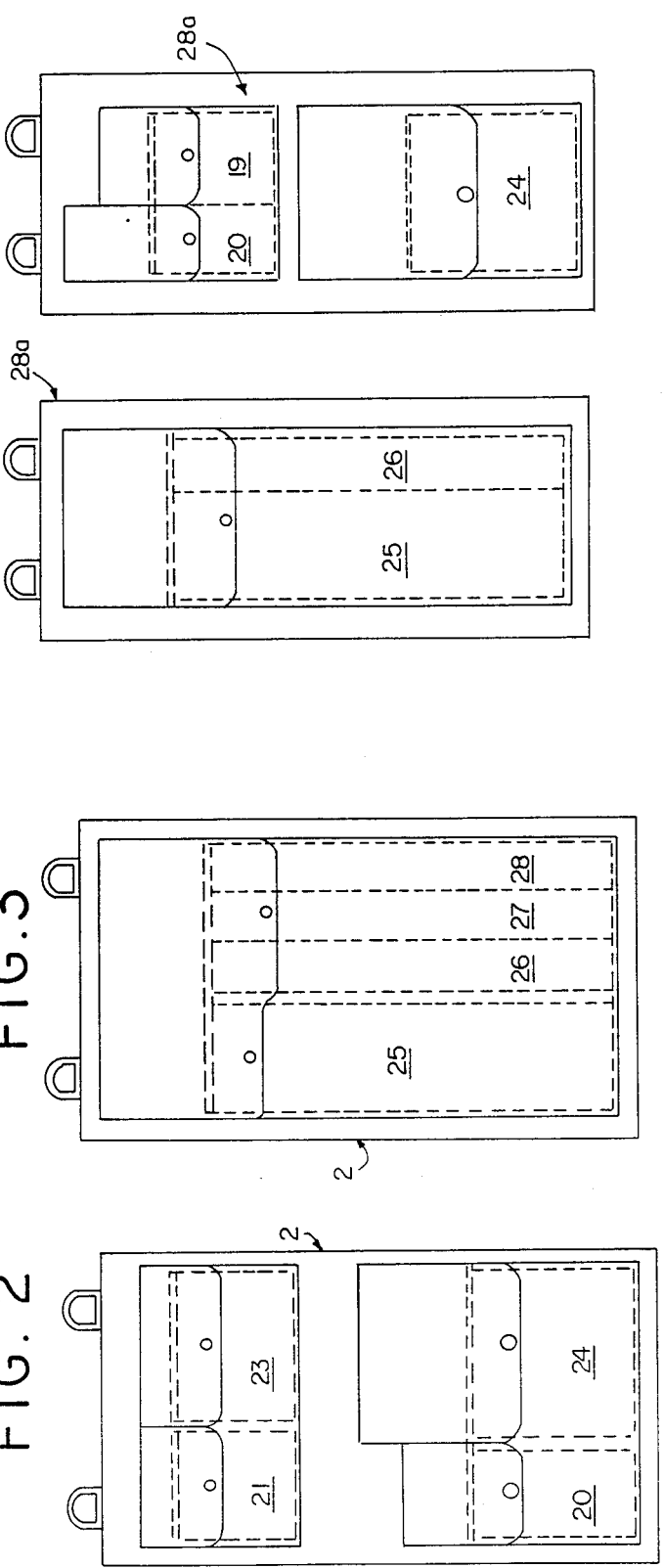

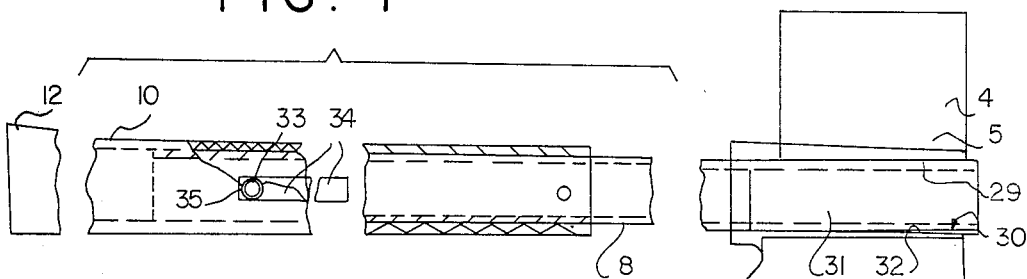
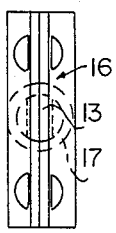
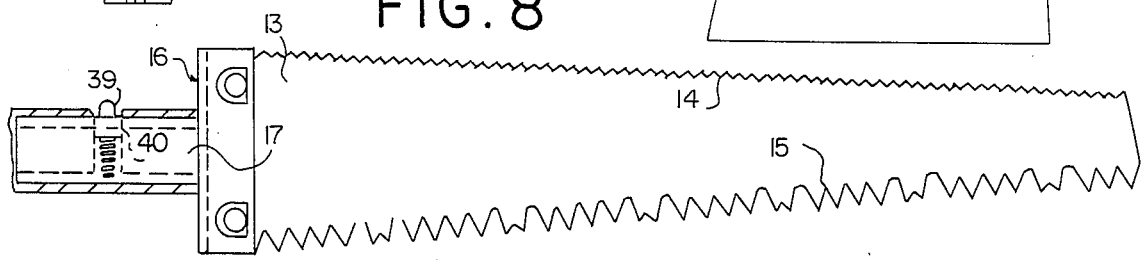
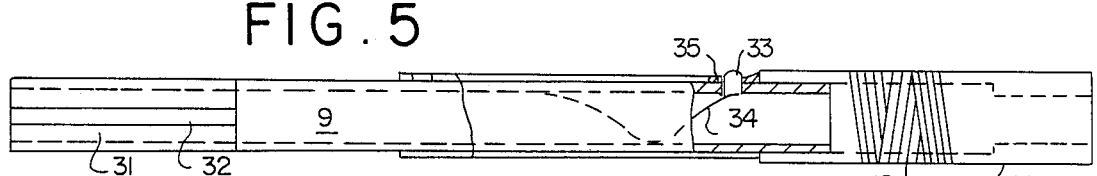
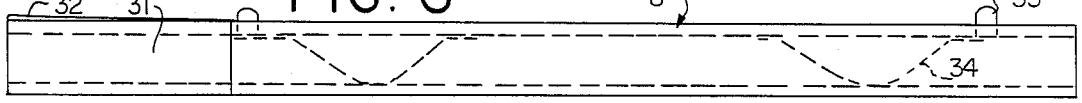

OUTDOOR CUTTING KIT APPARATUS

BACKGROUND OF THE PRESENT INVENTION

The present invention relates to an outdoor cutting kit apparatus and particularly to a compact broken down cutting tool assembly formed as a compact kit unit.

In various outdoor activities particularly, camping, hunting and the like, various cutting devices are often desirable if not absolutely essential. Thus, hatchets, wedge devices, saws with varying cutting teeth, knife devices and the like are often used by campers and hunters. Although various well known and highly satisfactory devices are available, they are generally single tool devices formed as a complete integrated unit. Knives are often provided in a form of an appropriate jack knife, the "Swiss" jack knife being a well known and widely used multiple element jack knife used by hunters, campers and the like. Certain other devices have been suggested in the prior art for assembling of various implements in a more or less kit form. Hatchet and wedge devices which are often used with a swinging motion present special problems in that care must be taken in any kit apparatus that the head structure is interconnected to the handle structure with a reliable and safe structure and one which essentially assures that the head will not separate from the handle during use.

Thus, although the prior art has provided various suggestions, the prior art does not provide the high degree of safety in muliple implements which may be desired by the outdoorsman.

SUMMARY OF THE PRESENT INVENTION

The present invention is particularly directed to a cutting tool kit for outdoorsman and the like providing a wide array of implements specially constructed for long, reliable use as well as safety in use. Generally, in accordance with the present invention, the kit assembly is provided with a saw implement, a hatchet implement and/or an ax implement, all in the form of an appropriate head member without an operating or manipulative handle. The kit assembly also includes a multiple handle assembly for selective interconnection to each of the cutting heads, as well as other instruments such as sharpening tools, multiple blade knives and the like. The multiple handle assembly includes special interconnection between the heads and tubular coupling openings in the ax and/or hatchet heads to insure the effective retaining of the head onto the handle during use. In addition, handle extensions include tubular portions adapted to telescope onto the head handles and to a corresponding element on the saw to permit the selective interconnection thereto for selective use of the several tools. In addition, the ax and hatchet multiple handle parts may be formed of slightly different lengths to permit the interconnection of the several handle elements with an optimum handle length. The extension handle structures are preferably provided with simple pin openings adapted to cooperate with effective spring-loaded pin structures for interconnection to the saw and to the head handles. This provides a very convenient and reliable interconnection of the handle extensions to the appropriate implements. Thus, the forces in the handle are linear forces and the projecting pin and opening consequently provides a highly effective and reliable interconnection.

Each of the hatchet and ax heads have an integral connecting hub with elongated tubular opening in the head. The opening is formed of a generally tubular slightly tapered opening with a tapered peripheral recess which tapers from an inner edge of the tool to the outer edge of the tool. The head handle includes a solid or tubular member which has an edge projection on one end and a handle grip oh the opposite end connected by a slightly tapered connecting portion and a tapered edge connection. The edge portion tapers outwardly from the tubular handle connecting portion to the outer tip. The handle portion is thus of a lesser diameter than the coupling portion. The head handle is passed downwardly through the opening in the ax head and secured in place by tapping the handle tightly into the head opening. Swinging of the ax or hatchet structure creates forces tending to move the head outwardly thereby more firmly wedging of the head onto the handle to insure a very firm and reliable interconnection. The key-way type connection provided by the tapered recess and projection further maintains the proper orientation of the handle structure with respect to the ax head. The handle extension includes a tubular portion adapted to telescope over the head handle and having at least one radial opening and preferably a plurality of longitudinally spaced openings. The head handle includes a spring loaded coupling pin adapted to mate and project through an opening with the extension or grip handle telescoped over the head handle and the pin aligned with an appropriate opening. The longitudinally spaced openings permit various telescopic extensions of the handle for establishing various lengths. Certain embodiments of small and large ax heads may be provided with related apertures or head openings. Multiple handle elements may be provided having similar head coupling structures but of slightly different lengths for varying of the length of the handles provided on the implements.

In addition, the saw head includes a short stub shaft projecting longitudinally from the end of the saw blade. It is provided with an appropriate spring loaded pin to permit telescopic receiving of either of the extension Or grip handles for the ax.

A flat carrying case includes individual pockets to the opposite sides thereof for individual storage of each component of the tool assembly.

The present invention has been found to provide a very compact, versatile outdoorsman cutting kit unit which can in its maximum assembly provide a pair of different sized ax heads, a saw blade, as well as such auxiliary equipment such as sharpening devices and multiple blade knives; all in a compact carrier.

BRIEF DESCRIPTION OF THE DRAWINGS

The drawings furnished herewith illustrate the best mode presently contemplated for the invention and are described hereinafter.

In the drawings:

FIG. 1 is an elevational view of a multiple outdoorsman kit including a storage and carrying case, a pair of ax heads, a saw blade and multiple handle sections for assembly therewith as well as a jack knife and a sharpening stone, such as typically used by outdoorsman, to provide a more complete kit;

FIG. 2 is a front elevational view of a storage and carrying case illustrating the support for implements shown in FIG. 1;

FIGS. 2a and 2b illustrate an alternate carrying case for a smaller list of the implements shown in FIG. 1;

FIG. 3 is an elevational view of the opposite face of the case shown in FIG. 2 and showing balance of the support for the other elements shown in FIG. 1;

FIG. 4 is a view showing the ax head assembled with parts broken away and sectioned to show the interlock between the ax head and the handle members; nd FIG. 5 is another view of the handle members shown in FIG. 1;

FIG. 6 is an enlarged elevational view of another head handle shown in FIG. 1;

FIG. 7 is an enlarged elevational view of a grip handle shown in FIG. 1;

FIG. 8 is a view of a saw unit with a grip handle, shown in part secured thereto; and FIG. 9 is an end view of the saw unit.

DESCRIPTION OF THE ILLUSTRATED EMBODIMENT

Referring to the drawings and particularly to FIG. 1, a kit 1 of various outdoor tools are illustrated in a disassembled relationship for storage and packaging as a kit in a suitable carrying case 2 such as shown in FIGS. 2 and 3 for convenience storage, transport and the like. The illustrated kit includes a typical large ax head 4 having a tubular handle coupling hub 5 intermediate its length. A relatively small ax or clever head 6 is also provided having a corresponding tubular handle coupling hub 7. Four straight handle members are illustrated including first and second head handles 8 and 9 adapted to be selectively coupled to either of the heads 4 or 6. The head handles 8 and 9 are of slightly different lengths. In addition, two grip handles 10 and 11 are provided having outer grip 12 and 12' respectively, on one end. The handles 10 and 11 are otherwise similarly constructed as tubular members for selective telescopic coupling to one end of the head handles 8 and 9 for corresponding forming of the ax with an appropriate handle length. In addition, the kit includes a relatively short saw blade 13, having appropriately different teeth 14 and 15 on the opposite edges of the blade. A coupling head 16 is secured to the one end of the saw blade 13 and includes an outwardly projecting tubular shaft 17. The shaft 17 is adapted to be telescopically coupled to either of the extension grip handles 10 or 11 to provide an opening handle with a convenient grip 12 for sawing operations with the saw blade.

In addition, the assembly preferably includes a typical multiple bladed jack knife 18 and a wet stone 19 for sharpening of the edges of the several cutting tools, and particularly the knife blades and the ax heads. The tool implements are conveniently packaged in a leather carrying case 2, such as shown in FIGS. 2 and 3. Referring particularly to FIG. 2, a plurality of pockets 20, 21, 23 and 24 are provided in the one side of the relatively flat carrying case for receiving of the knife, the wet stone and the two hatchet heads, respectively. FIG. 3 illustrates the opposite side of the case 2 and includes pocket 25 for the saw blade and a plurality of tubular pockets 26, 27 and 28 for receiving of the handle members. The pockets 26–28 are formed to accommodate the longest handle member. The relatively short head handle 9 and short grip handle 11 can be assembled in telescoped relation and form a member essentially corresponding in length to the long handle member and thus accommodated in a single tubular pocket.

An alternate basic kit may be provided including an ax head, a saw, a single handle, a knife and sharpening stone. A storage and carrying case 28a is shown in FIGS. 2a and 2b for the basic kit.

More particularly in the illustrated embodiment of the invention, the heads of the several tools and the handle extensions are formed as telescopic members more particularly as shown and described as follows.

Referring to FIG. 4, the large ax head 4 is shown interconnected to the large head handle 8 and the extension or grip handle 10. The tubular head hub 5 of the ax is shown as a typical cylindrical enlargement having internal special head opening 29, having a slight taper. The opening 29 immediately adjacent to the cutting side of the head 4 is provided with a tapered wedge portion or key-way 30 which tapers from the inner edge of the head hub and flares outwardly at a constant angle to the outer edge of the hub 5.

The head handles 8 and 9 are similarly constructed with a mating portion. Thus, with particular reference to the interconnected longer head handle 8, as illustrated in FIGS. 1 and 4, the head handle has a slightly tapered end or portion 31 of a diameter generally corresponding to the diameter of the head opening 29 and particularly of a diameter no greater than the opening 29. In addition, the handle includes a tapered key 32 on the head coupling portion 31 which substantially corresponds to the length of the hub. Thus in assembly, the head handle 8 is dropped through the opening, with the key 32 aligned with the longitudinal keyway 30 in the head hub 5. The handle is firmly forced into the hub to provide a firm interengagement. Swinging of the ax of course results in a outward centrifugal force on the head 8 tending to move the head outwardly into even more firm seated engagement within the keyway 31 thereby increasing the interconnection between the head and the handle. The tubular handle extends outwardly with a relatively constant diameter. As shown in FIG. 6, the head handle 8 may advantageously include a safety locking pin 32a which resiliently abuts the hub 5 to prevent the head from sliding down the handle.

A lateral resiliently loaded coupling pin 33 is located within a lateral opening 31 in the handle 8, with the opening spaced slightly inwardly from the outermost end of the handle 8. In the illustrated embodiment of the invention, the pin 33 is secured to the free end of a serpentine or wave shaped spring 34 which projects inwardly and is secured within an axial opening 35 in the handle structure. The illustrated spring has a generally U-shape with the outer ends curved backwardly as at the crest of a sine wave or serpentine portion. Thus, the pin 33 is secured to the spring end and the spring is collapsed and forced into the handle until the pin 33 is aligned with the opening 35. The pin 33 then pops outwardly through the opening 35 to secure the pin and spring within the head handle, with pin 33 resiliently held in place.

The extension grip handles 10 and 11 are similarly formed. Again, with reference to the large or longer extension handle 10, it is a tubular member having an inner longitudinal opening 36 with an internal diameter generally corresponding to the external diameter of the outer end portion of head handle 8. The handle 10 has a plurality of radial openings 35 which are longitudinally spaced along the handle and particularly a coupling end of the handle. The openings 35 are spaced within a length no greater than the length of the cylindrical portion of the head handle. Thus, the grip handle 10 can be telescoped over the head handle until any one of the openings 35 is aligned with the pin 33 in the head handle, with the pin moving outwardly to interconnect the grip handle 10 to the head handle 8 and to complete ax structure, as shown in FIG. 4.

A similar assembly of the relatively short head handle 9 and the extension handle 11 for attachment to the clever or ax head is shown in FIG. 5. The handles 9 and 11 including the coupling portions are formed with a construction similar to that of handles 8 and 10. The various members can be interchanged to provide various desired handle lengths. In addition as previously noted, the short handle structure has a total length corresponding to the length of the larger handle members, generally as shown in FIGS. 5, 6 and 7, and thereby permitting the compact assembly in the three tubular pockets 26-28 of the core.

In addition, as shown in FIG. 8, the saw blade 3 is formed with the tapered construction, with the coupling head 16 secured to the wide flange end. The head 16 is shown including a split mounting block member telescoped over the end edge of the blade and riveted, bolted or otherwise securely interconnected to the blade. The coupling shaft 17 is integral with the member and projects outwardly in appropriate centered relationship to the blade 13. The shaft 17 is a tubular member having a spring-loaded pin 39 secured within the coupling shaft 17 and with the pin projected outwardly through a radial opening 40 within the shaft. The pin 40 is spaced in accordance with the first opening 37 in the extension or grip handles 10 and 11. Either of the grip handles 10 and 11 can be coupled to the blade to provide a convenient handle with a grip portion for using the saw.

The saw blade 13 is a saw blade having a different shaped teeth 14 on the opposite edges of the tapered blade for different cutting actions as required by campers, hunters and like outdoorsmen.

The present invention with the telescopic handles and the special wedged head connections of the ax members, particularly with the interchangeability of the several handle members and the various cutting tools, provides a highly satisfactory and safe assortment of tools at a reasonable cost.

The present invention thus provides a very significant improvement in a tool kit assembly for assembling of various tools to a common handle structure, thereby providing a compact assembly particularly adapted for outdoor activities and the like.

Various modes of carrying out the invention are contemplated as being within the scope of the following claims particularly pointing out and distinctly claiming the subject matter which is regarded as the invention.

I claim:

1. A cutting tool assembly for various cutting functions including cutting of wood, animals and other outdoor elements, comprising at least one ax head having a tubular hub having a handle opening to receive a handle projecting from one end of the hub and terminating adjacent the opposite end of the hub, a saw blade having a handle coupling shaft member secured to one end and projecting longitudinally therefrom, said shaft member having a diameter corresponding to the hub opening, a two piece handle assembly including a first head handle having a tubular handle portion of a diameter corresponding to the diameter of said hub opening and a coupling end portion, said coupling end portion and said tubular hub having securement means for releasably connecting said handle to said hub, the outer end of said handle being a tubular member having an opening adapted to telescope onto the shaft member of said saw blade and having securement means for releasable connected to said saw blade whereby said handle unit is adapted for selectively completing the ax and the saw for use, said head opening of said ax having an internal cylindrical opening of a constant diameter and a longitudinally extended tapered keyway extending throughout the total length of said cylindrical opening to prevent outward movement of the head from said handle.

2. The assembly of claim 1 wherein said head handle includes an outer tubular end including a small radial coupling opening spaced inwardly from the outer most end, a pin member located in said radial opening and a spring means located within the handle portion and resiliently urging and supporting the pin projecting outwardly of the periphery of the handle portion, an extension grip handle having a tubular end with an opening complementing the outer tubular end of the head handle and adapted to be telescoped thereover, said extension grip handle having at least one radial opening for alignment with the opening in the head handle for releasable coupling to said pin for interlocking of said handles and thereby providing an extension to said head handles, said grip handle having an outer grip portion.

3. The assembly of claim 1 including a second head handle having a coupling end corresponding to said coupling end of said first head handle and having an outwardly extending handle portion of a diameter no greater than said hub opening, said second head handle having a handle portion of a different length than the handle portion of said first handle.

4. The assembly of claim 3 including a first and second grip handle having different lengths, each of said first and second grip handles telescopically coupled to said head handles.

5. In a cutting tool assembly, comprising a cutting head having a coupling head with a generally cylindrical hub opening, a multiple handle assembly for selective interconnection to said cutting head, said handle assembly including a head handle having a cylindrical end portion complementing said hub opening, said hub and head handle having complementing locking means retaining the head onto the handle during said cutting motion, a lock unit coupled to said head handle adjacent the cylindrical end portion and preventing the handle from moving down said head handle, handle extension members include tubular portions adapted to telescope onto the head handle to selectively extend the length of the handle, and wherein said head opening of said ax has an internal cylindrical opening of a constant diameter and a longitudinally extended tapered keyway extending throughout the total length of said cylindrical opening to prevent outward movement of the head from said handle.

* * * * *

UNITED STATES PATENT AND TRADEMARK OFFICE
CERTIFICATE OF CORRECTION

PATENT NO. : 4,958,395

DATED : September 25, 1990

INVENTOR(S) : ARTHUR C. BUSSKOHL

It is certified that error appears in the above-identified patent and that said Letters Patent is hereby corrected as shown below:

Claim 1, column 6, lines 9-10, delete "connected" and substitute therefor -- connection --; Claim 5, column 6, line 45, delete "head" and substitute therefor -- hub --.

Signed and Sealed this

Second Day of June, 1992

*Attest:*

DOUGLAS B. COMER

*Attesting Officer*     Acting Commissioner of Patents and Trademarks